(12) United States Patent
Villarrubia

(10) Patent No.: US 8,474,623 B2
(45) Date of Patent: Jul. 2, 2013

(54) ECOLOGICAL SNACK BAG

(76) Inventor: Kel Villarrubia, New Orleans, LA (US)

( * ) Notice: Subject to any disclaimer, the term of this patent is extended or adjusted under 35 U.S.C. 154(b) by 0 days.

(21) Appl. No.: 13/446,932

(22) Filed: Apr. 13, 2012

(65) Prior Publication Data

US 2012/0261293 A1    Oct. 18, 2012

Related U.S. Application Data

(60) Provisional application No. 61/475,066, filed on Apr. 13, 2011.

(51) Int. Cl.
*B65D 33/16* (2006.01)
(52) U.S. Cl.
USPC .......................... 206/524.1; 383/63; 383/109
(58) Field of Classification Search
USPC ............. 206/484, 484.2, 524.1, 524.2, 524.3, 206/524.9, 524.6; 383/93, 95, 105, 109, 100, 383/101, 103, 116, 63
See application file for complete search history.

(56) References Cited

U.S. PATENT DOCUMENTS

| | | | | |
|---|---|---|---|---|
| 7,712,962 B1 * | 5/2010 | Reuhs et al. | ................... | 383/111 |
| 2008/0296446 A1 * | 12/2008 | Iwasaki | ........................... | 248/95 |
| 2013/0078401 A1 * | 3/2013 | Tang | ............................ | 428/34.1 |

* cited by examiner

*Primary Examiner* — Jacob K Ackun
(74) *Attorney, Agent, or Firm* — Warner J. Delaune; Baker Donelson

(57) ABSTRACT

A reusable bag for storing foods is provided, comprising an outer material constructed from a polyethylene terephthalate (RPET) non-woven fabric; an inner lining constructed from a multilayer material comprising: a first aluminum layer, a layer of polyethylene terephthalate (PET) adhered to the first aluminum layer, and a second aluminum layer adhered to the layer of polyethylene terephthalate (PET); wherein the inner lining and outer material are formed in the shape of a bag having an opening; and (c) a zip-lock fastener adhered to the opening, wherein the zip-lock fastener is adapted to permit a secure closure and water-tight seal of the bag.

5 Claims, 1 Drawing Sheet

ECOLOGICAL SNACK BAG

CROSS-REFERENCE TO RELATED APPLICATIONS

This nonprovisional patent application claims priority to provisional patent application U.S. Ser. No. 61/475,066, filed on Apr. 13, 2011.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates to improved ecological or "green" snack bags and related products, and more particularly to those snack bags which can be reused many times before disposal.

2. Background

Resealable bags used for the temporary storage of sandwiches and similar foods and snacks have always been disposable items. The ecological problems associated with disposal of these polypropylene bags is well known, although there has been little effort expended to develop an ecologically safe and durable alternative. An alternative sandwich or snack bag should have at least the following features: (1) a zip lock closure device, (2) an airtight or water-tight containment volume, (3) a stain-proof exterior material, (4) reusable, (5) recyclable, and (6) zero waste when finally disposed.

SUMMARY OF THE INVENTION

A reusable bag for storing foods is provided, comprising an outer material constructed from a polyethylene terephthalate (RPET) non-woven fabric; an inner lining constructed from a multilayer material comprising: a first aluminum layer, a layer of polyethylene terephthalate (PET) adhered to the first aluminum layer, and a second aluminum layer adhered to the layer of polyethylene terephthalate (PET); wherein the inner lining and outer material are formed in the shape of a bag having an opening; and a zip-lock fastener adhered to the opening, wherein the zip-lock fastener is adapted to permit a secure closure and water-tight seal of the bag.

In a preferred embodiment, the zip-lock fastener is constructed from polyethylene.

In another embodiment, the zip-lock fastener is heat-sealed to the opening.

Optionally, the outer material includes custom printing for labels and other indicia.

In a more preferred embodiment, the outer material and the inner lining are sewn to one another when the bag is formed.

BRIEF DESCRIPTION OF THE DRAWINGS

The aspects of the invention will now be described by way of example only with reference to the accompanying drawings, in which.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
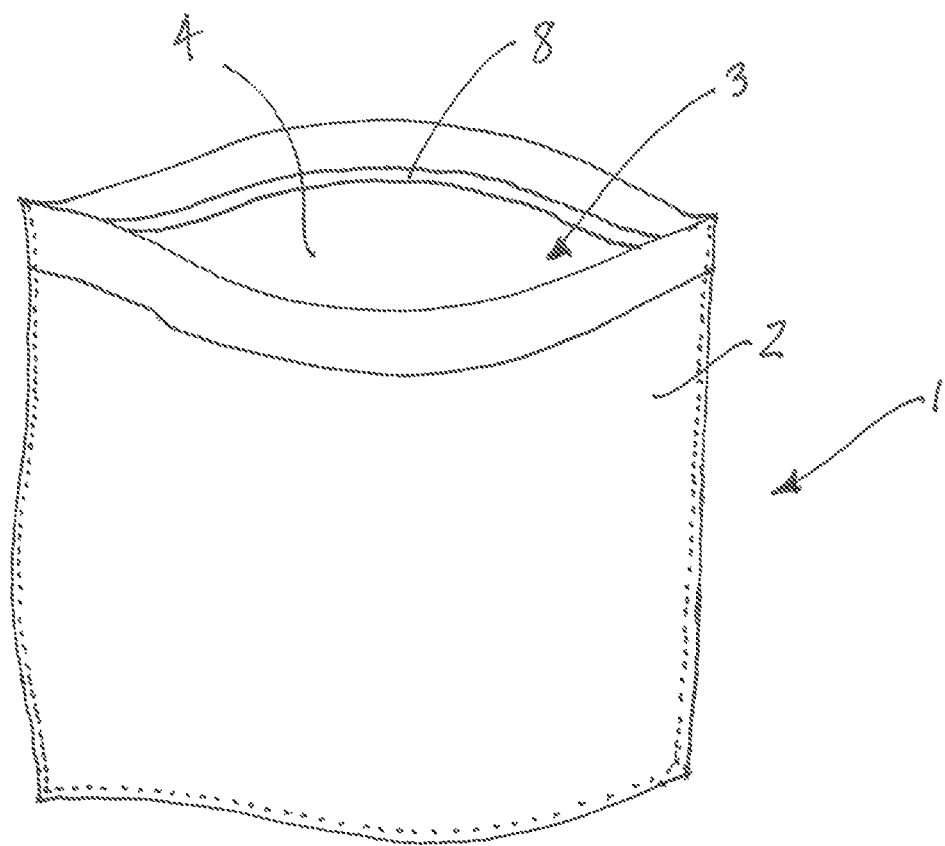
FIG. 1 depicts a preferred embodiment of a snack bag in accordance with the present invention.
Figure 2:
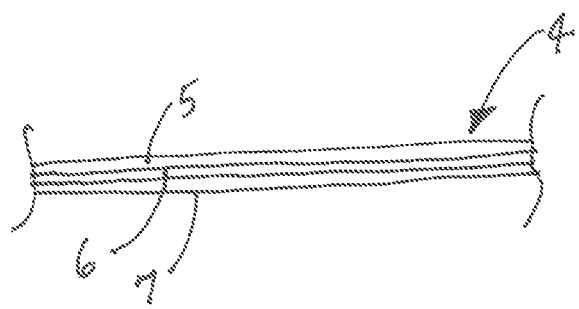
FIG. 2 is a sectional view of the layers of the inner lining to depict the multiple layers used in the construction.

In a preferred embodiment, the improved snack bag 1 is constructed in accordance with the following materials and methods. The outer fabric 2 of the bag 1 is preferably constructed from a 100% reprocessed polyethylene terephthalate (RPET) non-woven fabric, and is formed such that a conventional bag shape is established through sealing or sewing on three sides, leaving an opening 3 to the containment volume of the bag 1. Inside the bag 1, and attached to the inner surfaces of the outer fabric 2, is an inner bag or lining 4. As best shown in the sectional view of FIG. 2, the inner bag 4 is constructed from a multilayer material comprising a first aluminum layer 5, a layer of polyethylene terephthalate (PET) 6, and a second aluminum layer 7, wherein each of these layers is adhered to its adjacent layer. The aluminum layers 5, 7 are similar in composition to such layers used in bags for potato chips and other snack foods. This construction creates a durable material that safely contains the food, while remaining durable and washable over many uses. A zip-lock type fastener 8, typically constructed from polyethylene, is adhered to the opening 3 to permit a secure closure and water-tight seal of the bag 1.

The method of constructing the snack bag 1 is as follows. First, the inner bag 4 is molded according to the desired size. Next, the zip-lock fastener 8 at the opening is heat-sealed to the inner bag 4. Finally, the outer RPET non-woven fabric 2 (with optional custom color laminated printing for labels or other indicia) is laid over the inner bag 4, and the inner and outer bags 2, 4, are then sewn together in the conventional manner.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

I claim:
1. A reusable bag for storing foods, comprising:
   (a) an outer material constructed from a polyethylene terephthalate (RPET) non-woven fabric;
   (b) an inner lining constructed from a multilayer material comprising:
      a first aluminum layer, a layer of polyethylene terephthalate (PET) adhered to the first aluminum layer, and a second aluminum layer adhered to the layer of polyethylene terephthalate (PET);
      wherein the inner lining and outer material are formed in the shape of a bag having an opening; and
   (c) a zip-lock fastener adhered to the opening, wherein the zip-lock fastener is adapted to permit a secure closure and water-tight seal of the bag.
2. The bag of claim 1, wherein the zip-lock fastener is constructed from polyethylene.
3. The bag of claim 1, wherein zip-lock fastener is heat-sealed to the opening.
4. The bag of claim 1, wherein outer material includes custom printing for labels and other indicia.
5. The bag of claim 1, wherein the outer material and the inner lining are sewn to one another when the bag is formed.

* * * * *